US008234169B2

(12) United States Patent
Fraser

(10) Patent No.: US 8,234,169 B2
(45) Date of Patent: *Jul. 31, 2012

(54) DYNAMIC METHOD AND APPARATUS FOR DIRECT MARKETING

(76) Inventor: Eileen A. Fraser, Santa Monica, CA (US)

( * ) Notice: Subject to any disclaimer, the term of this patent is extended or adjusted under 35 U.S.C. 154(b) by 1965 days.

This patent is subject to a terminal disclaimer.

(21) Appl. No.: 10/860,231

(22) Filed: Jun. 3, 2004

(65) Prior Publication Data

US 2005/0273384 A1    Dec. 8, 2005

(51) Int. Cl.
*G06Q 30/00* (2012.01)

(52) U.S. Cl. .......... 705/14.67; 705/14.4; 705/14.41; 705/14.49; 705/14.53; 705/14.66; 705/7.29; 705/7.31; 705/7.33; 455/415; 379/69; 379/76; 379/88.2; 379/88.22; 379/32.05

(58) Field of Classification Search .......... 705/14.4, 705/14.41, 14.49, 14.53, 14.66, 14.67, 7.29, 705/7.31, 7.33; 455/415; 379/32.05, 69, 379/76, 88.2, 88.22

See application file for complete search history.

(56) References Cited

U.S. PATENT DOCUMENTS

| 6,055,513 A | 4/2000 | Katz et al. |
| 6,424,949 B1 | 7/2002 | Deaton et al. |
| 2002/0055906 A1* | 5/2002 | Katz et al. ............ 705/39 |

OTHER PUBLICATIONS

Dialog reference, file 570 #01710955 titled "Inbound gets high-tech Boost" by Jim Ahearn, Target Marketing, V21, n12, p. 63(9), Dec. 1998.*

* cited by examiner

*Primary Examiner* — Raquel Alvarez
(74) *Attorney, Agent, or Firm* — Sanford Aster; Brooks Kushman P.C.

(57) ABSTRACT

Method and apparatus for direct marketing comprising establishing a first communications link between a prospective customer using a device having a unique identification number and a communications device, automatically transmitting the unique identification number associated with the prospective customer's device to the communications device, establishing a second communications link between the communication device and a computer operably connected to a tangible memory apparatus having a prospective customer database comprising prospective customer information associated with the unique identification number of the prospective customer's device.

27 Claims, 7 Drawing Sheets

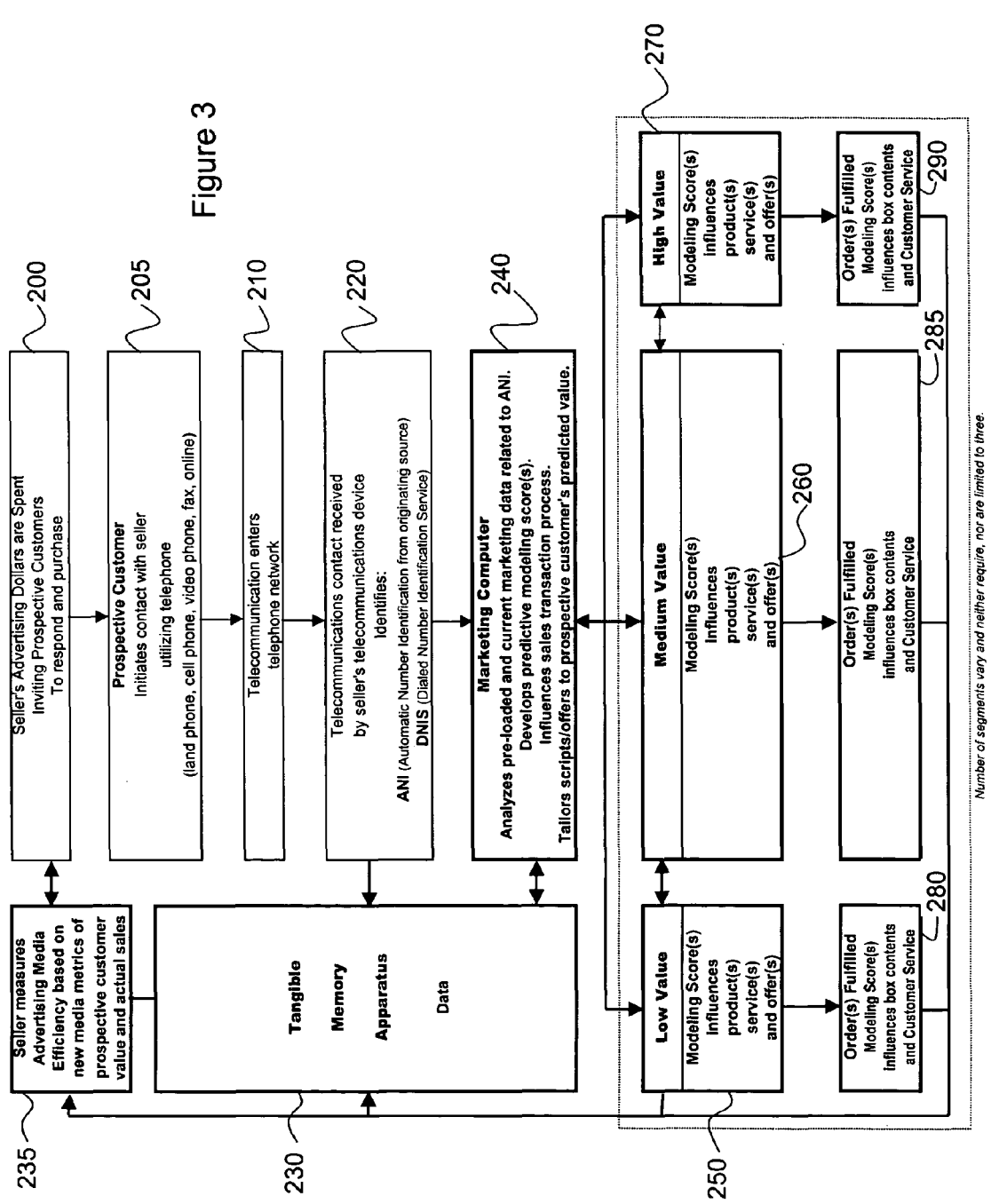

Historical Media Metrics, by total orders

| By Market, Station, Airing | Net Media Buy | Total Calls | Total Orders | Total Revenue |
|---|---|---|---|---|
| Cable - one week of airing | $3,125 | 50 | 19 | $ 4,818 |
| | | *Value of callers is unknown* | Average Order Value = | $ 254 |

| By Market, Station, Airing | Net Media Buy | Media Cost per Order | Conversion to Order % | Telemarketing Cost per Order (CPO) |
|---|---|---|---|---|
| Cable - one week of airing | $3,125 | $ 164 | 38% | $ 10 |
| | | Media Earned Revenue (MER) = 1.54 | Average Talk Time Minutes/Order = | 8.0 |

Figure 4A

Method of Advertising Resource Allocation which Makes Use of Modeling Score(s)
Demonstrating How Invention Changes Advertising Media Metrics

| By Market, Station, Airing | Net Media Buy | Total Calls by Prospective Customer Value | | | | Total Orders by Prospective Customer Value | | | | Total Sales Revenue According To Prospective Customer Value | | | |
|---|---|---|---|---|---|---|---|---|---|---|---|---|---|
| | | High | Medium | Low | Total | High | Medium | Low | Total | High | Medium | Low | Total |
| Cable - one week of airing | $3,125 | 10 | 15 | 25 | 50 | 8 | 11 | 6 | 25 | $ 4,800 | $ 1,650 | $ 600 | $ 7,050 |
| | | % of all callers | | | | % of all orders | | | | % of all sales revenue | | | |
| | | 20% | 30% | 50% | 100% | 32% | 44% | 24% | 100% | 68% | 23% | 9% | 100% |

Analysis of Results:
Spend same in media as in Fig. 5A

- Only 20% of callers High Value
- 50% of callers were Low Value

- High Value over delivered in orders
- Low Value under delivered in orders

Average Order Value (AOV)
| $ 600 | $ 150 | $ 100 | $ 282 |

- High Value were 20% of callers & 68% sales
- Low Value were 50% of callers & 9% sales
- Additional sales generated = $ 2,232
- % Sales Revenue Increased = 32%
- AOV Increased = 11%

| By Market, Station, Airing | Net Media Buy | Media Cost Allocated By Caller & Prospective Customer Value | | | | Conversion to Order % by Prospective Customer Value | | | | Telemarketing Cost Per Order (CPO) by Prospective Customer Value | | | |
|---|---|---|---|---|---|---|---|---|---|---|---|---|---|
| | | High | Medium | Low | Total | High | Medium | Low | Total | High | Medium | Low | Total |
| Cable - one week of airing | $3,125 | $625 | $938 | $1,563 | $3,125 | 80% | 73% | 24% | 50% | $ 14 | $ 9 | $ 5 | $ 9.5 |

Media Cost Per Order
| $ 78 | $ 85 | $ 260 | $ 125 |

Media Earned Revenue (MER) Per Order
| 7.68 | 1.76 | 0.38 | 2.26 |
| 340% | 78% | 17% | 100% |
Increase in MER: 68%

Telemarketing Talk Time Minutes Per Order
| 11 | 7 | 4 | 7.6 |

Ratio Of Customer Value Groups To Average Minutes
| 1.46 | 0.93 | 0.53 | 1.00 |

Analysis of Results:
Spend same in media as in Fig. 5A

- High Value delivered 3.4x average MER
- Lowered overall media CPO from $164 down to $125, or down 31%
- Overall Media efficiency increased
- MER up from 1.54 to 2.26,
- an 68% increase in media efficiency

- Converted 80% of High Value
- Converted 24% of Low Value
- Converted 50% of all callers

- Spent 46% MORE time talking to High Value
- Spent 47% LESS time talking to Low Value
- Overall Telemarketing cost DOWN (5%)
- Overall Sales Revenue UP 32%

Figure 4B

DYNAMIC METHOD AND APPARATUS FOR DIRECT MARKETING

FIELD OF THE INVENTION

The present invention relates to a method and apparatus for providing acute marketing intelligence about prospective customer(s) and direction to sales representatives, telemarketers, political communicators and the like, utilizing telecommunication equipment for communicating with, but not limited to individuals, businesses, affiliated groups, interviewees and the like, which is dynamically triggered at the time telephonic contact is made with the prospective customer and the Automatic Number Identification of the telephone utilized by this prospective customer is transmitted. The present invention may be utilized in situations where the contact is initiated by the seller's representative or by the prospective customer. The invention may be utilized in, but is not limited to, areas such as marketing of goods and services, politics, and any other matter where a database of the prospective customer's activities may be utilized to develop modeling score(s) to provide to the seller's representative offering scripts and/or information useful in providing to the prospective customer or interviewee a customized offering. The invention may utilize the Automatic Number Identification for the telephone utilized by the prospective customer and/or the Dialed Number Identification Service identifying the particular telephone number or "application" dialed by the prospective customer. As used herein, a prior customer may also be described as a prospective customer or prospective purchaser.

BACKGROUND

At the present time, telemarketing (i.e., marketing through the use of telephonic equipment) and other business, political, etc. communications utilizing telephonic communications with prospective purchasers, interviewees, and the like are known and utilized. Many of these systems and methods utilize what is referred to as Automatic Number Identification (ANI), which is a unique series of digits or pulses received from one of two sources. The ANI is a unique number identifying the telephone from which a telephone call is placed. The ANI may be received by the telecommunication equipment to which a telephone call is placed from a long-distance telephone company or from a local telephone company.

Sometimes, ANI is referred to as "Caller I.D." These digits or pulses are received from the local telephone company which is utilized by the caller's telephone equipment. For all area codes including area codes 800, 888 and 900, ANI is provided. At the present time, a caller cannot block ANI.

Accordingly, a caller can be identified by the unique automatic number identification code received at the receiver's location. Thus, when a caller initiates a telephone call with, for example, a company offering products or services for sale and seeks to order products or services from the company, the company has the capability of uniquely identifying the telephone number used by the caller to make the telephone call through the ANI.

Another feature presently used by telemarketing and related businesses is known as Dialed Number Identification Service (DNIS). DNIS is a feature that provides to the receiver of the telephone call the number the caller actually dialed (and thus the identity of the entity called). For example, a plurality of companies may utilize the same sales representative firm with each company maintaining a separate and distinct telephone number(s) so as to spread the cost of the sales representatives or interviewers among the plurality of companies.

Each of the companies advertises its respective telephone number(s) for use by those desiring to purchase its products and/or services. Arrangements can be made by such companies for each of the respective telephone number(s) to be received by the same sales representative firm (or by the company itself). The sales representative firm employs one or more telemarketing individuals to answer the calls. The individuals making the call are not aware that they are not talking directly to the person located at the company advertising the product and/or service. Since calls for a number of different products and/or services can be received by the same sales representative firm, the sales representative firm can be staffed so that the telemarketing individuals are busy speaking with callers a high proportion of the time. The individual companies may be charged by the sales representative firm on a per-call, per length of call or some other mutually agreeable basis.

At the present time, almost every prospective purchaser calling a telemarketing company receives the same offer or "script". Thus a person likely to make a high value purchase is provided the same offer via the same prepared script as a person highly unlikely to make any purchase or a low value purchase. At times some telemarketers receive unique customer information when volunteered by the caller during the contact when relevant to the specific contact. This process requires the contact to provide information as to his or her identity or some other identifying factor to be of future value.

At the present time, companies that may take advantage of ANI for maintaining databases, do not utilize ANI to drive a unique experience, nor to update the database of customer activity until after the caller has made a purchase decision and the sales representative has finalized or closed the transaction. Additionally, each company maintains its own customer information including customer phone numbers and generally does not share the information with others. Accordingly, the purchaser information in the database does not automatically play a role in the interaction between the caller and the sales representative. Nor does industry wide information automatically play a role in such interactions.

The databases presently being compiled and indexed according to ANI contain valuable information regarding the activities conducted from various telephones.

The present systems that utilize ANI do not utilize the information to customize a "script" for the telemarketer or utilize ANI as a delivery mechanism to pull in computed modeling score(s) to increase the probability of a successful sale. Models are mathematical equations utilizing variables which are used in marketing to predict or anticipate the behavior of potential customers.

What is needed is a method and apparatus for utilizing ANI as a delivery mechanism to pull in customer identity and/or modeling score(s) so that a sales representative will be instructed regarding offerings to be made to callers based upon the activity associated with the telephone utilized by the caller through the use of the ANI. Additionally, the usefulness of the database increases as the amount of information in the database increases. Accordingly, there is a need for an ANI database containing information for businesses and others using telecommunications systems to share information and maintain an up-to-date database so as to communicate offerings to sales representatives during communications with prospective purchasers, so that the sales representative may communicate the offering to the potential customer.

Also, there is a need for the development of heuristic models to dynamically affect the telemarketing process to increase the probability of sales success, to increase average order value and improve prospective customer relationships utilizing ANIs and a database containing previous activity associated with the telephone having the ANI. It would be extremely useful to generate such modeling score(s) and provide scripts to sales representatives while the sales representatives are in real time telephonic contact with the prospective customer. It would also be of great industry value to lower costs and modify marketing efforts to align telemarketing costs and media spending with customer value.

There is also a need for an apparatus and method for selecting customized marketing materials and the like to be included with orders being fulfilled, such customization based in part upon the activity conducted from the telephone (and its unique ANI) used by the respective customers.

There is also a need for post-purchase or post-response marketing, sometimes referred to herein as second tier marketing, which provides a subsequent contact that is highly relevant to the individual. These messages can be delivered to the individual and utilize the modeling score(s) to increase communication relevance through channels such as e-mail, online, direct mail, print, catalog, or surveys.

BRIEF DESCRIPTION OF THE INVENTION

The present invention fulfills inter alia, the aforesaid needs and desires.

The present invention is able to capture and record marketing data from not only an individual source but also from a plurality of sources to provide broad based background information, marketing intelligence and predictive modeling scores associated with an ANI. Such information is of high value to the telemarketing industry and to the media industry. Purchasing and other related information associated with an ANI is analyzed to produce modeling score(s) which predict the activity of a prospect associated with an ANI. As the amount of relevant information associated with an ANI increases, the likelihood, and thus, the value of the prediction increases. There may be a high modeling score for product A, but a low modeling score for product B for the same ANI.

Modeling score(s) may be computed after an interaction with an ANI or the information concerning the contact with the ANI may be stored in tangible memory apparatus and modeling score(s) may be computed when a subsequent contact occurs. Additionally, modeling score(s) may be re-computed or updated based upon the prospect's actions during a contact.

The present invention is a method and apparatus which utilizes the ANI of the caller's telephone to a business or other activity. Through the use of a database categorized by ANIs, predictive modeling scores are developed which are transformed into offerings communicated to the sales representative. The sales representative then is able to communicate these offerings to the caller. These offerings are developed based upon the previous activity associated with the specific ANI and may also be based upon the prospective customer's decisions during the telephone call.

In a preferred embodiment of the invention, DNIS is utilized to identify the business, purpose and/or application which the caller has dialed.

In another preferred embodiment, the database of activity associated with a particular ANI is utilized to influence the contents containing offerings placed in shipping cartons (and the like) containing the products ordered by the caller and/or the confirming documentation of products and/or services ordered by the caller.

In still another preferred embodiment, the analyses of advertising media efficiency are now altered to illuminate the quality of the prospects responding to, and the customers buying from, a particular advertising media buy. Responders, prospective customers and sales may be evaluated based on ANI modeling score segments. This establishes new advertising media spending analyses based on prospective customer value segments.

In yet another preferred embodiment, the prospective customer, or now the customer, receives relevant follow-up contact, called second tier. This second tier contact ranges from a thank you for your interest, or for purchasing, through to product lifecycle and warranty information. Additional products may be offered that tie to the prior interest or purchase.

When telephonic contact between a prospective customer and a telemarketer is initiated, the ANI identification of the caller's phone is linked to a preferred embodiment of the invention. Modeling score(s) most relevant to the business called, which is identified by means of the Dialed Number Identification Service (DNIS) are either retrieved from the memory apparatus or calculated contemporaneously. The invention selects the most advantageous script offers and provides the script to the telemarketer by means of the telemarketer's video display terminal. On the telemarketer's video display terminal appears a "pop-up" with the script, as selected by a preferred embodiment of the invention. A prospective customer value indicator visible to the telemarketer also appears in an alternative embodiment. At the beginning of a telephonic contact, the prospective customer is placed in telephonic contact with the telemarketer. The telemarketer is ready to begin the conversation, and the telemarketer reads the script to the prospective customer. In a preferred embodiment of the invention, the primary product(s) and/or service(s) are offered. Depending on the success with primary offering, an alternative preferred embodiment of the invention next produces a pop-up of a script for secondary product(s), and/or service(s). This process may be continued if the prospective customer is receptive.

The generation of modeling score(s) of previous activity associated with the ANI enables businesses and the like to customize offerings to callers based upon previous activity associated with the ANI. This customization provides to the prospective customer options for products and/or services which the prospective customer is more likely to need or desire based upon the previous activity associated with the telephone linked to the particular ANI. This is beneficial to the prospective customer and the business offering the goods, services, etc. The prospective customer is more likely to have his/her needs and/or desires fulfilled. The business is able to provide products and/or services in a more focused manner thereby lowering its costs and making the business' offerings more monetarily competitive which also benefits the prospective customer.

The invention may be utilized when a business or the like is contacted by a caller or when initiation of the call is by the business or other organization to the prospective customer. Thus, the invention is utilizable regardless of which side of a potential transaction initiates the call.

The invention has the effect of lowering the cost of the sales representative or interviewer function for each of the companies while increasing the sales revenue. Using DNIS, each of the sales representatives or interviewers is automatically informed of the number dialed by the caller and/or the company or business that the caller dialed. Thus, the DNIS feature is used to identify to the answering telephone system and/or sales person the "application" and/or business that the caller dialed.

Accordingly, the present invention introduces many refinements and improvements over the present state of the art. In addition to the refinements and improvements set forth above, additional advantages and improvements over the state of the art will be apparent to those having ordinary skill in the art reviewing the detailed description of the invention set forth below.

BRIEF DESCRIPTION OF DRAWINGS

The drawings are schematic and not necessarily to scale.

FIG. 3 is a flow chart illustrating the steps in the implementation of one preferred embodiment of the invention;

FIG. 4A is an example of present day practice for evaluating media metrics;

FIG. 4B is an example of evaluation of media metrics utilizing the invention and demonstrating how the invention changes advertising media metrics;

DETAILED DESCRIPTION OF THE PREFERRED EMBODIMENT

Further scope of the applicability of the invention will become apparent from the detailed description given hereinafter. However, it should be understood that the detailed description has specific examples, which while indicating preferred embodiments of the invention, are given by way of illustration only, since various changes and modifications within the spirit and scope of the invention will become apparent to those having ordinary skill in the art from this detailed description. Accordingly, this detailed description is given for purposes of illustration and not to limit the invention in any way. The Brief Description of the Invention is incorporated herein by reference.

Figure 1:
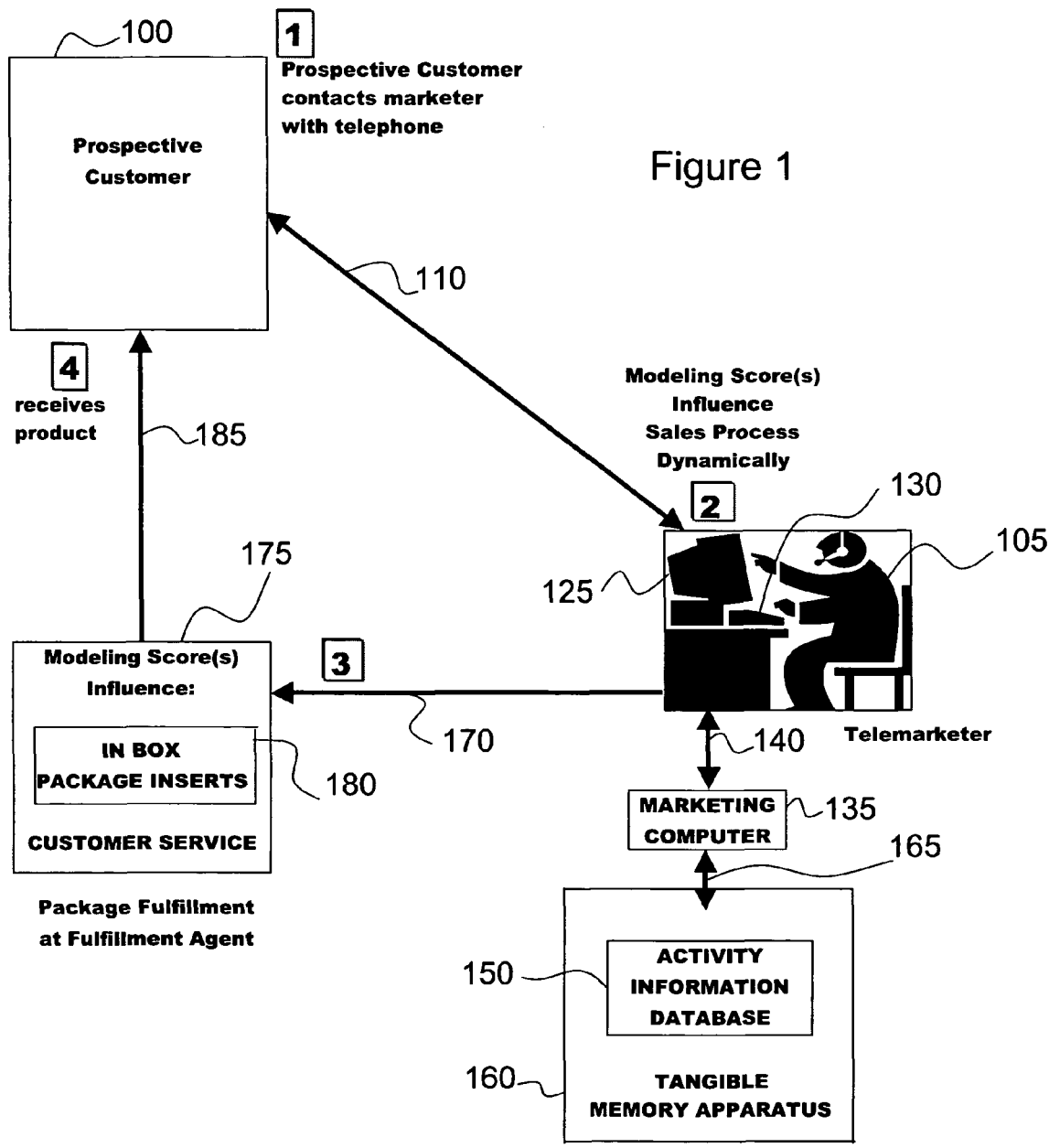
FIG. 1 is a diagrammatic figure illustrating the inter-relationship of the various users of the invention.
Figure 2:
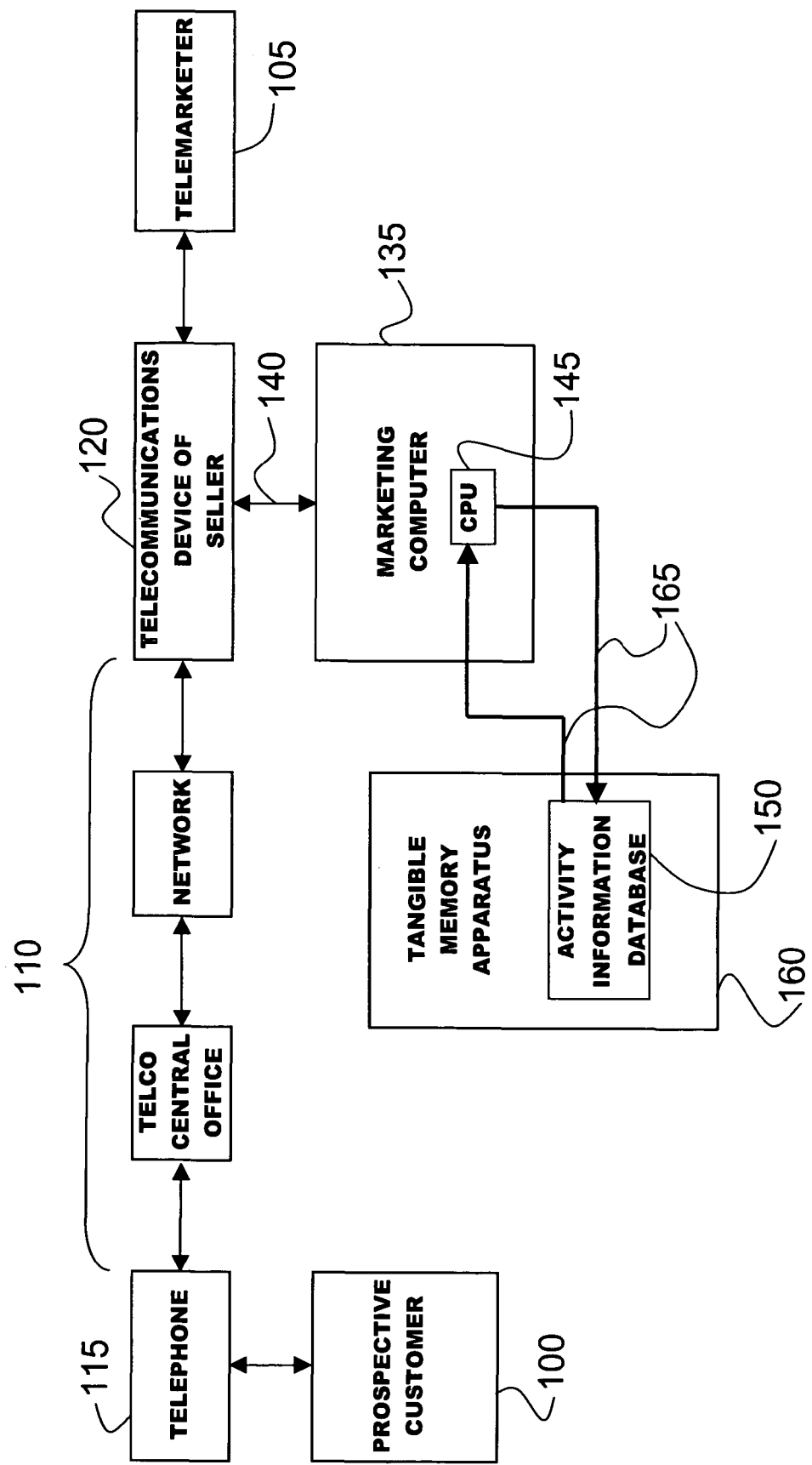
FIG. 2 is a block diagram illustrating the various portions and interconnections of the communications channel, database and marketing computer when the invention is in use.

Initially referring to FIGS. 1 and 2, there is depicted in each figure, an illustration of the relationship and method of interaction between a prospective customer 100 and a telemarketer 105, by means of a communications link 110. It will be understood by those having ordinary skill in the art that either the customer or the telemarketer may initially establish the communications link 110. Also, it will be understood by those having ordinary skill in the art, that at the customer end of the communications link 110, the customer utilizes a telephone 115. At the sales representative's end of the communications link 110, the sales representative utilizes a telephonic device which provides telephonic communications with the customer. The telephonic device used by the sales representative also comprises a video display device 125 and keyboard 130 which are operably connected to a marketing computer 135 by means of second communications link 140. It will be understood by those having ordinary skill in the art that the communications link 140 may be relatively short physically as the marketing computer 135 may be in the same location as the sales representative 105. Alternatively, those having ordinary skill in the art that the second communications link 140 may be a Local Area Network or a longer communications link as the marketing computer 135 may be located virtually anywhere will also understand it. It is possible that the second communications link 140 comprises a public or private communications channel of any type capable of carrying digital information utilizing a number of modulation techniques known to those having ordinary skill in the art.

The marketing computer 135 contains a central processing unit CPU 145 for performing operations based upon applications programs resident on the computer 135 or able to be "called up" by the computer 135 from an applications library (not shown). The applications library comprises software program(s), which are capable of producing modeling score(s), based upon data. Persons having ordinary skill in the art of modeling are capable of preparing, without undue experimenting, such software program(s). The construction and building models is also well known to those having ordinary skill in the art of modeling. For example, publications such as *The Data Modeling Handbook—A Best Practice Approach To Building Quality Data Models* by Michael C. Reingruber and William W. Gregory (Wiley-QED, John Wiley & Sons, Inc., 1994) and *Data Modeler's Workbench—Tools and Techniques for Analysis and Design* by Steve Hoberman (Wiley Computer Publishing, John Wiley & Sons, Inc., New York, 2002) which are incorporated herein by reference as if set forth in full, explain and teach the art of modeling. Attached hereto as Appendix I—pages 1 and 2, which are incorporated by reference herein, is a list of potential factors used to compute modeling scores. However, it will be appreciated and understood that other factors may be used in building models and computing model score(s). Additional information respecting model building is set forth below.

The central processing unit 145 of the marketing computer 135 is operably connected to a database of activity information 150 which resides in tangible memory apparatus 160.

In a preferred embodiment of the invention, an applications program capable of generating model score(s) is based at least in part upon the historical purchasing information associated with an ANI and/or the contemporaneous decisions made by the prospective customer during the telephone conversation and other relevant factors. This is discussed in further detail below.

Communication between the central processing unit 145 and the purchaser activity information 150 is by means of communications channel 165. It will be appreciated by those skilled in the art that communications channel 165 may be simplex or duplex and that the CPU 145 is capable of reading the purchaser activity information 150 and updating the purchaser activity information 150 on the tangible memory apparatus 160.

The marketing computer 135 is capable of providing information and instructions to the telemarketer 105 by providing written instructions to the telemarketer 105 which instructions may be displayed on the video display terminal 125. The telemarketer is able to provide information for use by the marketing computer 135 through the inputting of information by use of the keyboard 130 (or touch screen not shown or any other apparatus by which an individual could communicate with a computer).

As discussed in detail elsewhere, the marketing computer 135 can provide modeling score(s) based at least in part upon the activity information 150. The modeling score(s) may be generated prior to, at the commencement of, or during, the telephone conversation between the telemarketer 105 and prospective customer 100. Based upon the modeling score(s) and the identity of the business with which the customer is in contact, a "script" is projected on the telemarketer's video display terminal 125. The "script" provides the telemarketer with the offering to be made to the customer 100. As will be appreciated by those having ordinary skill in the art, a new script may be presented to the telemarketer by means of the video display terminal after each decision is made by the customer in response to a previous script. The customer's decision is recorded in the purchaser activity information database 150 and an application program is utilized in conjunction with the marketing computer 135 to generate new modeling score(s) and a new "script."

As the customer 100 makes decisions to purchase or declines a particular product or service, the marketing computer 135 through the central processing unit, updates the purchaser activity information database 150 through communications channel 165. When the telephone call with the customer is terminated an order is then generated by the marketing computer which reflects the customer's purchasing instructions. This order is sent to a fulfillment location through the use of communications channel 170. The customer order generated by the marketing computer 135 may include instructions for package inserts and/or customer service which is influenced by the modeling score(s) generated by the marketing computer (which is discussed below), the customer is more likely to need or desire. This information is also transmitted by means of communications channel 170 to the fulfillment location 175. At the fulfillment location 175, inserts 180 are placed in the packaging for the product ordered and/or the confirmation documents acknowledging the order. This packaging is forwarded to the customer by shipping 185. Shipping 185 may be shipping services such as the United States Postal Service, United Parcel Service, Federal Express, or the like.

Next referring to FIG. 3, the implementation of one preferred embodiment of the invention is shown.

The business makes decisions regarding the purchasing of advertising media 200. These decisions are based upon the products and/or services to be offered and the target market which the business desires to serve. Set forth below in more detail is the process by which the amounts spent on advertising media may be evaluated and future decisions concerning advertising media expenditures may be made.

The prospective customer initiates contact with the seller by utilizing a telephone at step 205. The telephonic communication initiated by the prospective customer may be initiated by means of a traditional land or lined telephone, a cell phone, a video phone, fax, or through use of the worldwide computer network commonly called the Internet.

The telephonic communication initiated by the customer enters the public telephone network at step 210. The public telephone network is the communications network operated by various telephone and telecommunications carriers.

The telecommunications contact is received by the seller's communications device at step 220. Also received by the seller's telecommunications device are the automatic number identification ("ANI") from the public telephone network, and from the dialed number identification service ("DNIS") if the seller utilizes these services. For this discussion, it is assumed that not only does the seller make use of ANI service, but also utilizes DNIS service. It will be appreciated that an embodiment of the invention may be practiced without utilization of DNIS service.

ANI identifier may be included in radio frequency transmitting devices activated by human or non-human means, telephonic communications conducted via TV cable or TV satellite systems. This is discussed in more detail below.

At step 240, ANI and DNIS information is transferred to the marketing computer and the marketing computer analyzes pre-loaded marketing information. The preloaded marketing information is transferred from the tangible memory apparatus at 230 for processing by the marketing computer. The marketing computer step 240 develops a predictive modeling score or scores based on activity related to the ANI. It will be understood by those having ordinary skill in the art that such analysis and the computation of modeling score(s) may occur prior to initiation of the telephone call. The DNIS may also be used to further customize the modeling score(s). The data regarding the factors utilized in computing the modeling score(s) are retained in the tangible memory apparatus 230 where the data are updated based upon new or additional information that may be obtained.

The modeling score(s) are used to choose a "script" for a product or service offering to the prospective customer which is transferred and displayed on the video display terminal utilized by the telemarketer. Other information may also be displayed to the telemarketer regarding potential transactions, offerings, customer value index, level of anticipated purchase and the like via the modeling score(s). There is then a plurality of sales transaction processes which may occur during which the telemarketer engages in offering various transactions or other offers to the prospective customer. These alternative transaction paths are set forth for purposes of illustration and not by way of limitation. These three illustration paths begin with steps 250, 260 and 270, respectively.

Each of the replies of the prospective customer are inputted by means of the telemarketer's keyboard 130 (or similar function device) which information is transferred to the marketing computer 135 and the marketing computer not only updates the activity information database 150 in the tangible memory apparatus 160, based on the prospective customer's response to each of the offerings, which may also update modeling score(s) and also instructs which "script(s)" to utilize for a subsequent offering at steps 250, 260, or 270.

Transaction path 250 is referred to herein as the low-value path. This path may be utilized for ANIs for which the system anticipates little sales opportunity and/or potentially high seller expense. Transaction path 250 is utilized for offerings for prospective purchasers for which some marketing information is available and for which the marketing score(s) generated for the ANI indicate the prospective customer is of low value. The results of the interaction between the telemarketer and the prospective customer are transferred to the marketing computer and/or the tangible memory apparatus which then instructs secondary offerings and may result in new modeling score(s).

Transaction value path 260 illustrates the offerings for prospective purchasers for which some marketing information is available and for which the modeling score(s) generated for the ANI indicate the prospective customer is of medium value. Of course, the precise boundary between low value customer and a medium value customer is flexible and will vary from industry to industry and may vary from product to product. The tangible memory apparatus generates marketing score(s) based upon the purchaser activity information available and generates primary offerings via the marketing computer. Based upon the response to the primary offerings, the marketing computer is capable of generating additional modeling score(s). The marketing computer may then order script pop-ups and secondary offerings to be presented to the prospective customer by the telemarketer.

There is also a high value transaction path 270 illustrated. The high value path 270 is for a prospective purchaser for which the ANI information indicates and the customer's previous marketing information indicates is a good candidate for purchase or a good candidate for purchasing high value items or services. The marketing computer generates modeling score(s) based upon purchaser activity and information it has and based upon the primary product offering responses which are used to update the purchaser activity information database. Secondary product offerings are made based upon additional modeling score or scores which would be calculated by the marketing computer and which would then order pop-up secondary offerings to be presented to the prospective customer by the telemarketer.

By way of illustration and not by way of limitation, applicant has illustrated low, medium and high value transaction paths. It will be appreciated by those having ordinary skill in the art, that the number of potential transaction paths or segments may be fewer than, or more than, the three paths or segments illustrated in FIG. 3.

At the conclusion of the transactions with the prospective customer, the order or orders are fulfilled at steps 280, 285 and 290 depending on which transaction path is utilized. Based upon the fully updated customer identity information which included the decisions made by the prospective customer to the product offerings, modeling score(s) or values (such as, high, medium or low) are generated by the marketing computer which influences or controls the tangible or written offering materials which are included with or in the box or boxes in which the products containing the products purchased by the customer are enclosed. Similarly, with services purchased by the customer, such written offering materials may be included in the envelope or envelopes which contain the materials memorializing and confirming the customer's purchase of the services and supported by customer service.

Second tier marketing contact may be initiated and may also be influenced by modeling score(s) in order to enhance the customer relationship. Such contact may range from a simple "thank you," and product satisfaction surveys through cross sell and/or up sell product opportunities.

By way of illustration and not by way of limitation, applicant has set forth four potential types of transaction paths that may occur. It will be appreciated by those having ordinary skill in the art, that the number of potential paths may be less than or more than these four transaction paths and the transaction paths may have greater or fewer steps.

EXAMPLE 1

High Value Prospective Customer

This example of a high value transaction is for illustrative purposes and should not be viewed as a limitation on the invention.

1. Prospective customer dials phone number to marketer;
2. Phone call is received
3. ANI is identified
4. DNIS is identified
5. Invention triggers the telemarketer's video display terminal to show appropriate "script". High value identifier is also viewed by telemarketer on video display terminal.
6. For example, the script may be "Thank you for calling today. In addition to the exercise equipment you are calling about today, I also have a professional version of this exercise equipment and there are just 3 left. The professional version has stronger metal, gear-driven mechanics and a 10-year warranty. I can offer it to you today for $X with free rush delivery and free shipping and handling. Would you like to upgrade to the professional version?" This high value offer script is read to the prospective customer by the telemarketer. And the customer responds.
7. If the prospective customer responds affirmatively, the response is inputted on the keyboard (or other appropriate input device) and the invention causes the following "script" to appear on the video display terminal, which is read to the prospective customer: "In addition to your professional exercise equipment, we have a sound system you can hook up to your exercise equipment. With it, you can exercise your mind while you exercise your body. It comes with a self-improvement CD series on 'how to build a business, lose weight, etc.' You will receive 4 CDs per month. Can we add the sound system and CD series to your order?" In this example, we assume the prospective customer responds affirmatively and the affirmative response is entered on the keyboard (or other appropriate device) by the telemarketer.
8. Based upon the affirmative response, the invention causes a new "script" to appear on the telemarketer's video display terminal which is read to the prospective customer: "Our fitness trainer, Mr. X, will be in California next month and Mr. X is setting up 1 on 1 private consultations. Would you be interested in a private training session?" We assume in this example that the prospective customer responds affirmatively and no further "scripts" are shown.
9. The Telemarketer captures the full name, address, shipping and credit card information of the customer and inputs the information on his keyboard. As used in this example and the examples below, it will be understood that the term credit card includes a traditional credit card, debit card, e-check, and any other form of electronic money transfer.
10. The invention in a preferred embodiment may evaluate sales revenue against advertising media spending. Response and order information is transmitted to the advertisers and/or their advertising media buying company. Advertisers and/or their advertising media buying company analyze the advertising media efficiency based upon ANI segments such as high/medium/low value prospects that called and/or ordered, as well as sales revenue by high/medium/low segments.
11. The order is transmitted to the fulfillment agent along with instructions for package inserts to be included.
12. Fulfillment agent selects the products purchased, prepares the shipping box, and adds package inserts, ships box and activates the credit card charge.
13. Prospective customer may at a later time phone customer service center, where he is identified by ANI as a high value customer and routed to the highest level of customer service personnel.
14. E-mail confirmation is sent out with a "thank you" for buying. E-mail also notifies buyer of their custom, personalized web page, where customer can view their personal offers on complementary products. These offers are influenced by modeling score(s).
15. Catalog is mailed monthly and may contain offers influenced by modeling score(s). Catalog contains personalization.
16. Personalized invitation and new product announcement may be sent periodically via direct mail, as customer qualifies via modeling score(s).
17. Outbound telemarketing is utilized for courtesy calls such as product satisfaction, warranty updates and surveys.

Steps 14 through 17, inclusive, are part of the second tier marketing process.

EXAMPLE 2

Medium Value Prospective Customer

The following example of a medium value transaction is for illustrative purposes and should not be interpreted as a limitation on the invention.
1. Prospective Customer dials phone number to marketer.
2. Phone call is received
3. ANI is identified
4. DNIS is identified
5. Invention causes the telemarketer's video display terminal to display medium value script. Medium value identifier also displayed and viewed by telemarketer.
6. Medium value script, which is read by telemarketer to prospective customer is as follows: "Thank you for calling today. The exercise equipment you are calling about today has A, B, C benefits. May I take your order?" We assume prospective customer responds affirmatively and the response is entered by telemarketer through a keyboard.
7. The invention causes a subsequent script to appear in the telemarketer's terminal which is then read: Many of exercise equipment users enjoy an introductory package to a new diet plan. "We are offering low carbohydrate or low calorie packages for $X. Which would you like?" We assume an affirmative response which is inputted by means of the keyboard by the telemarketer.
8. The invention causes the following script to appear on the video display terminal which is read to the prospective customer: "And to keep track of your progress, an accurate weight scale is essential. We can send one with your order for $X and you will receive our free *Guide to Measuring Body Fat*. May we include this with your order?" We also assume that an affirmative response is received and there are no other offerings to be made.
9. Telemarketer captures full name, address, shipping and credit card information.
10. The invention in a preferred embodiment may evaluate sales revenue against advertising media spending. Response and order information is transmitted to the advertisers and/or advertising media buying company. Advertisers and/or advertising media buying company analyzes the advertising media efficiency based upon ANI segments such as high/medium/low prospects that called, high/medium/low customers that ordered, and sales revenue by high/medium/low segments.
11. Order is transmitted to fulfillment agent along with instructions for package inserts.
12. Fulfillment vendor selects the products purchased, prepares the shipping box, and adds package inserts, ships box and activates the credit card charge.
13. Prospective customer may at a later time phone customer service center where he is identified by ANI as a medium value customer and routed within the general pool of available customer service personnel.
14. E-mail order confirmation is sent out with a thank you for buying. E-mail also notifies buyer of their customer web page, where they can view personal offers on complementary products. Offers are influenced by modeling score(s).
15. Catalog is mailed bi-annually and may contain offers influenced by modeling score(s).
16. Personalized new product announcements are sent periodically via direct mail or e-mail.
17. Outbound telemarketing is utilized to restart dormant buyers.

Steps 14 through 17, inclusive are examples of steps in a second tier marketing process for a medium value customer.

EXAMPLE 3

Low Value Prospective Customer

The following example of a low value transaction is for illustrative purposes and should not be viewed as limiting the invention.
1. Prospective Customer dials phone number to marketer.
2. Phone call is received.
3. ANI is identified
4. DNIS is identified.
5. As above, the invention causes the telemarketer's video display terminal to display appropriate low value "script". Low value identifier is also displayed on video display terminal.
6. The script is as follows and is read to prospective customer by telemarketer: Thank you for calling today. The exercise equipment you are calling about today has A, B, C benefits. May I take your order?" Assuming the prospective customer replies affirmatively the response is imputed by the telemarketer by means of the keyboard. We also assume there are no other offerings made.
7. Telemarketer captures full name, address, shipping and credit card information and inputs the information.
8. The invention in a preferred embodiment may evaluate sales revenue against media spending. Response and order information is transmitted to the advertiser and/or advertising media buying company. Advertisers and/or advertising media buying company analyzes the advertising media efficiency based upon ANI segments such as high/medium/low value prospects that called, high/medium/low value prospective customers that ordered, and sales revenue by high/medium/low value segments.
9. The order is transmitted to fulfillment agent along with instructions for package inserts.
10. Fulfillment agent selects the products purchased, prepares the shipping box, and adds package inserts, ships the box and activates the credit card charge.
11. Customer may phone customer service at a later time, where he is identified by ANI and routed within the general pool of available customer service personnel.
12. E-mail confirmation is sent out with a thank you for buying. Online newsletter is sent monthly with new product offerings and offers.
13. Catalog is mailed annually with offers influenced by modeling score(s).
14. Outbound telemarketing is utilized to convert a second purchase and modeling score(s) influences offer.

Steps 12 through 14, inclusive are examples of steps in a second tier marketing process for a low value customer.

EXAMPLE 4

Reevaluation During Transaction

The Inventor sets forth an example of a prospective customer initially identified as a low value customer but during the telephonic interaction is reevaluated and recategorized as a high value customer.

1. Prospective Customer dials phone number to marketer.
2. Phone call is received
3. ANI is identified
4. DNIS is identified
5. Invention initially identifies prospective customer as low value and causes low value "script" to appear and low value identifier is also displayed on telemarketer video display terminal.
6. "Thank you for calling today. The exercise equipment you are calling about today has A, B, C benefits. May I take your order?" During the course of conversation the prospective customer volunteers that he was just transferred to a new location.
7. Telemarketer triggers "New Mover" status to system which in turn causes new script to be displayed which reads as follows: "As a recent mover, I'd like to offer you free our *How To Turn A Bedroom Into A Home Gym* booklet." This script is read to prospective customer and prospective customer makes a decision which telemarketer inputs.
8. New script appears as follows: "I can also offer you today for $20 off our monthly subscription rate of vitamins at $X to your order?" This is also read to prospective customer. We assume prospective customer accepts offer, which acceptance is inputted, and we also assume no further offerings are made.
9. Telemarketer captures full name, address, shipping, and credit card information.
10. The invention in a preferred embodiment may evaluate against media spending. Response and order information is transmitted to the advertiser and/or advertising media buying company. Advertiser and/or advertising media buying company analyzes the advertising media efficiency based upon ANI segments such as High/Medium/Low prospects that called, high/medium/low customers that ordered and sales revenue by high/medium/low segments.
11. The order is transmitted to fulfillment agent.
12. Fulfillment agent selects the products purchased, prepares the shipping box, adds package inserts, ships the box and activates the credit card charge.
13. Customer may at a later time phone customer service, where he is routed to the highest level of available customer service personnel.

It will be appreciated that a second tier marketing process may also be implemented in Example 4. Such second tier marketing processes are optional but high decibel in customer relationship marketing.

It will be appreciated and understood that the series of steps identified above need not be in the order set forth. By way of example, and not by way of limitation, in Step 10 of Example 1, Step 10 of Example 2, Step 8 of Example 3, and Step 10 of Example 4, dealing with the transmitting of customer information to advertisers and/or advertising media buying company may be done at an earlier or later step in the process. Similarly, in each of the examples, the capturing of prospective customer identity and location information may come at earlier or later times in the process.

Next referring to FIG. 4A, there is set forth an example of the presently utilized method of evaluating media metrics. In the example given, the media channel utilized is cable TV, and the example assumes one week of airing cable advertising. The cost of the cable advertising is assumed to be $3,125 (the net media buy). In the example given, it is assumed that 50 telephone calls are received. At the present time, telemarketers receiving such calls do not know the value of the individual callers. Additionally in the example, we assume that of the 50 prospective customers that call, 19 actually place orders. The total revenue of the 19 orders is $4,818. Thus, the average revenue per order is $254.

In the telemarketing industry there is a ratio known as the Media Earned Revenue (MER). The MER is defined as the ratio of the total revenue divided by the Net Media Buy, in this example, $4,818 divided by $3,125. Thus, in the example of FIG. 4A, the MER ratio is 1.54.

In this example, we also note that the conversion to order percentage, i.e., the ratio of total orders received divided by total calls received is 38%.

In the telemarketing field, the cost per order received is an important factor in evaluating media and advertising expenses. In this example, it is assumed that the average time that the telemarketer is on the telephone with a person who places an order is 8.0 minutes, and that the variable cost during the aforesaid communication is $1.25 per minute. Thus, the variable cost per order is $10, i.e. 8.0 minutes time @ $1.25 per minute. Thus, in the example of FIG. 4A, the cost per order (CPO) is $10.

FIG. 4B, shows how prospective purchasers may be classified into low, medium, and high value categories utilizing the invention. Results illustrate an overall higher conversion ratio.

Again, referring to FIG. 4B, an example of analyzing media metrics utilizing the invention to demonstrate how the invention changes advertising media metrics is given.

In FIG. 4B we assume the same media buy i.e., expenses as in FIG. 4A, i.e., one week of cable advertising having a cost of $3,125. However, utilizing the invention, calls received from prospective customers may be categorized as being received from high, medium and low value customers. This example assumes the same number of total calls as in FIG. 4A, i.e., 50 total calls. However, in FIG. 4B, use of the invention enables 10 of the callers to be categorized at the time each of the calls is received as high value, 15 of the callers categorized as medium value and 25 of the callers categorized as low value. Thus, the percentage of callers from each of the categories is known through use of the invention and is set forth in FIG. 4B.

The invention enables analysis of this information. Thus, through use of the invention, it is known that 20% of the callers may be categorized as high value, 30% are medium value and 50% of the callers are low value.

The customer value in each segment may also be determined through use of the invention. In the example, 8 of the high value callers actually placed orders. Thus, the high value callers, which were 20% of the calls received, placed 32% of all orders. Thus, the high value callers had a higher probability of actually placing an order. Similarly, the medium value callers comprised 30% of all calls received, and were 44% of all orders received.

In the example, the average order value (AOV) per high value customer was $600; the average order value per medium value customer was $150, and the average order value for the low value customer was $100. Thus, in the example while the average order value for all the customers was $282, the average order value for the high value customers was $600, more than twice as much as the average. The average order value for the low value customers was $100, which is approximately ⅓ of the average order value for all customers.

The analysis of the sales revenue according to prospective customer category is valuable to telemarketers. In the example, the total revenue received from the high value customers was $4,800. This represents 68% of all revenue received. Of importance is the knowledge that 68% of the total revenue is received from 20% of the callers, i.e., the high value callers, while merely being 20% of all callers, comprise 32% of the customers actually placing orders and 68% of the total revenue. The low value customers who were 50% of all callers were responsible for merely 9% of the total revenues. However, in our example, the total revenue received for all categories was $7,050, which is $2,232 more than the example of FIG. 4A. The reason for this increase in sales revenue of approximately 32% is set forth below.

Utilizing the invention, media costs may be allocated on a per category basis in the example. It will be seen that of the $3,125 in total media costs, approximately $625 or 20% may be allocated to the high value customers. This is computed by multiplying total media costs by the percentage of calls from each customer segment. Similarly, the media cost per order per segment may also be computed. The media cost per order for all orders is the total media cost ($3,125) divided by the total number of orders (25) which equals $125. The media cost per order for the high value segment is $625 divided by 8 orders which equals approximately $78. Media cost per order for the medium and low value categories may also be computed. Thus it will be seen that the media cost per order is less for the high value customer than for either the medium value or low value customers.

The media earned revenue (MER) per order is the total revenue $7,050 divided by the total media cost $3,125 or 2.26. This same calculation may be computed for each of the categories. Thus, for the high value category the total revenue received from this category is $4,800 and the media cost for the high value category is $625. Thus, the MER for the high value category is 7.68, which is approximately 340% of the MER for all categories combined. Thus, through use of the invention, the industry may better direct media purchases having data based upon customer categories. Additionally, information on the percentage of conversions to order, i.e., of the number of a particular category who call, the percent which actually place an order, may also be known. In the example given, of the 10 members of the high value category who call, 8 actually place orders. Thus, it can be ascertained that 80% of the members of the high value category actually place orders. In the example, it may also be seen that 24% of the customers in the low value category that call, actually place orders.

The invention is also important because it aids in the allocation of telemarketer time. In the example given, the average time with which a telemarketer is in telephonic contact with a high value customer who actually places an order is 11 minutes, which in our example we assume to cost $14 at a labor cost of $1.25 per minute. Thus, the variable labor cost in communicating between the telemarketer and the high value customers in the example is higher than for a customer in the low value category, which is in telephonic contact with the telemarketer for only 4 minutes. Furthermore, through use of the invention, unique or tailored messages for the customers may be utilized, thus generating higher revenue per order. Thus, even though on average, the telemarketer will spend approximately 46% more time talking to a high value customer who places an order, the average revenue of the high value customer is more than twice the average order value of all customers combined.

The invention enables the telemarketer to utilize time more efficiently and in a manner which generates higher revenue. The telemarketer may also spend less time on a customer in the low value segment because the invention will customize the presentation for someone within that segment. In the examples given, it will be seen that the average time spent talking to a customer is 8.0 minutes without utilizing the invention and 7.6 minutes when the invention is utilized. Even though less time is spent speaking with each customer on average, because these scripts are customized the telemarketer may spend more time with the high value customers and the total revenue will be higher. Additionally, it will be appreciated that even though more time is spent talking to the high value customers and the telemarketer is incurring additional expense for communicating with the high value customers, the total revenue is significantly higher by 32% in the example given.

The invention concentrates media and telemarketing efforts for better alignment with areas of greatest revenue opportunity, with the potential to increase sales revenue while lowering advertising and telemarketing expenses. For instance, the time spent speaking with a low value customer may be shortened so that the telemarketer may spend more time speaking with a high value customer through use of the invention.

Figure 5:
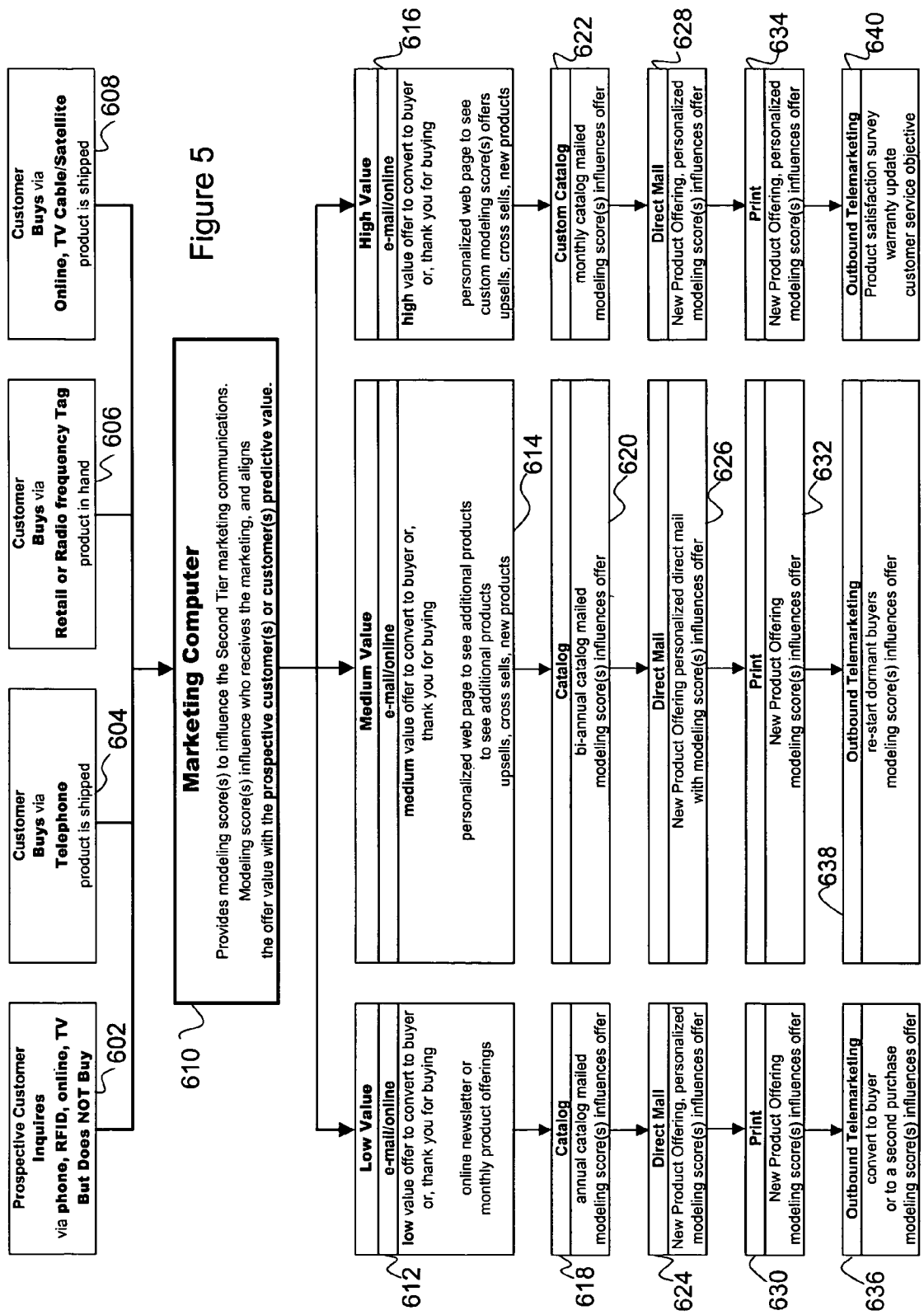
FIG. 5 is a more detailed representation of the invention for influencing second tier marketing.

FIG. 5 is a block diagram illustrating use of the invention for influencing marketing. As indicated above, second tier marketing is subsequent to the initial contact with the telemarketer. In FIG. 5 the inventor has set forth certain events which have occurred during communicating with the telemarketer or events relating to customer activity. For example, at 602, it is assumed that the prospective customer makes the inquiry but decides not to buy. Alternatively, at 604, the prospective customer makes the inquiry and buys the product via telephone and the product is shipped. Alternatively, the invention may be utilized when a customer buys a product at retail and the product or the associated packaging has a radio frequency identification (RFID) tag at 606. Through use of the RFID tag, a sensor and associated apparatus may be utilized to record the purchase activity of a customer.

Also by way of example and not by way of limitation at 608, a customer may buy a product on line utilizing the worldwide computer network (Internet), TV cable or satellite communications.

The above activity of the customer is relayed to the marketing computer 610 and the purchase or failure to purchase along with associated information such as the price; time of day, date, and any other related information that may be obtainable and significant to the user of the invention may be obtained. This information along with any other data, which may be available to the marketing computer, is used to generate new modeling score(s) or to influence the second tier marketing communications 610. The modeling score(s) influence who receives what information and aligns the offering and offering value with the prospective customer's modeling score(s) predictive value.

For example, for a low value customer, the low value customer may at step 612 be sent an e-mail of an offer. By acceptance of the offer, the low value customer may convert to a higher value customer. Also, an e-mail may set forth an offer or monthly or seasonal product offering.

Additionally, at step 618, a low value customer may be sent catalogs from time to time setting forth products and promotions that modeling score(s) indicate the low value customer may accept.

Additionally, at step 624, direct mail or particular product offerings personalized for the low value customer may be sent to him or her. At step 630, print media such as newspaper, free standing insert (FSI) and/or magazine advertisements, may be sent to the low value customer. These advertisements may also be customized for the particular low value customer. It is also possible that a telemarketer may call the customer at 636 to ascertain whether or not the customer is interested in purchasing a particular product or products. It will be understood that steps 612, 618, 624, 630 and 636 need not be implemented in the order given. The order and step(s) chosen will depend upon the particular customer and his or her customized modeling score(s) and the marketing activities available to the seller.

Alternatively, a customer may be considered a medium value customer. He or she may also be sent e-mails step 614, containing offers personalized to that customer. It is also possible to prepare personalized web pages for individual customers so that they may see additional product or products that may be of interest. These products may be considered upsells (i.e. a product related to a previous similar article purchased by the customer) cross sells (i.e., new products for which the customer may have an interest). Additionally, at step 620, the medium value customer may be sent catalogs from time to time. His or her modeling score(s) may influence the content and the frequency of such catalogs.

Medium value customers may also be sent direct mail at step 626. Such direct mail may be personalized based upon the modeling score(s) computed.

Print media containing advertisements for new product offerings may also be sent to medium value customers at step 632. To ascertain the medium value customer's interest the telemarketer may also call medium value customers at 638. Such telephone calls may also be utilized in a case when a particular customer has not made a purchase within a particular time period. It will be appreciated by those having ordinary skill in the telemarketing art that steps 614, 620, 626, 632 and 638 may be performed in a sequence other than as set forth in FIG. 5 and one or more of three steps may be omitted. It will be understood that modeling score(s) influence these decisions as to which method may be utilized based upon a cost benefit analysis.

Lastly, a situation of second tier marketing is illustrated for the high value customer. At step 616, the high value customer may be sent e-mail containing one or more offers to purchase a particular item. Also, personalized web page or pages may be utilized to show products to high value customers. As with medium value customers, the offerings may be up sells, cross sells or new products. This list is for illustrative purposes only and is not intended to limit the invention.

At step 622, the high value customer may be sent custom catalogs from time to time with a frequency and content that may be determined pursuant to his or her modeling score(s). Direct mail may be utilized at 628 featuring new product offerings.

Print advertising may be sent to the high value customer at 634. This print advertising may be personalized based upon modeling score(s) and may be for classic products or new product offerings. Additionally, the high value customer may be called at step 640 for customer service. For example, the high value customer may be questioned regarding product satisfaction, warranty information or for other objectives.

It will be understood that for second tier marketing, the particular product offered, the frequency of the offering, the dollar value of the offering, and the media utilized will be in part determined by the modeling score(s) and the resources and assets available to the marketer.

In another embodiment of the invention, a particular customer may utilize more than one telephone and be associated with more than one ANI. The invention is capable of keeping track of a plurality of phone numbers or ANIs for each customer. Thus, if a customer utilizes one or more land telephone lines at a time and his or her cell phone at other times, the invention is capable of keeping track of activities occurring on all these phones and aggregating the information when the modeling score(s) is computed The invention may be practiced in additional alternative embodiments.

Figure 6:
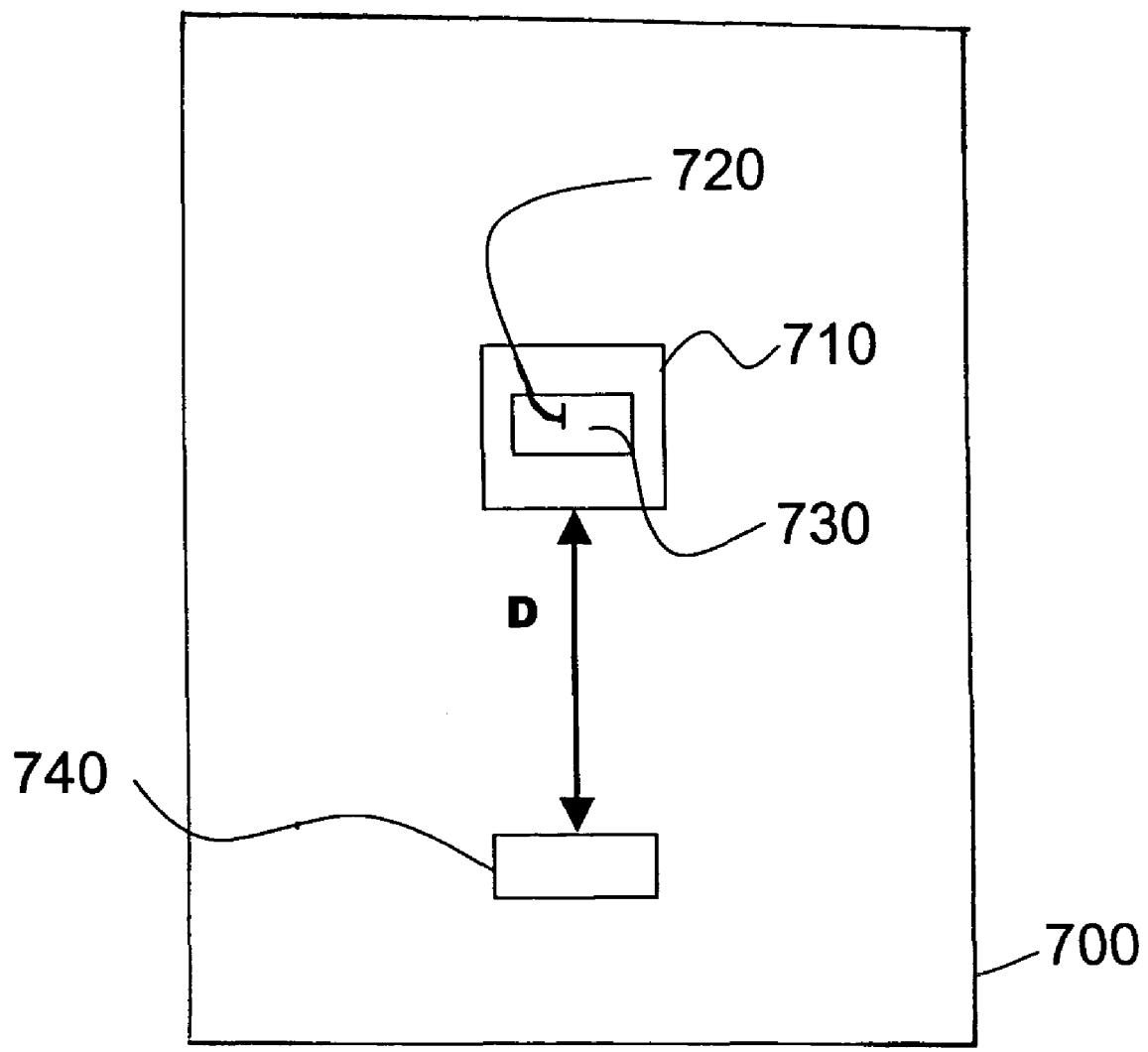
FIG. 6 is a diagram of an alternative use of the invention utilizing one or more radio frequency identification devices.

As video screens replace human clerks in many retail stores, video monitors are increasingly becoming a source of product informational. Referring to FIG. 6, a RFID tag 720 contains and transmits information and may be incorporated into a plastic credit and/or debit card 730. When activated, the RFID tag 720 transmits radio frequency (RF) signals a short distance (D). The RF signals are capable of being received by a specialized electronic device 740 in retail store display area 700. As a cardholder 710 passes through the store display area 700, RFID Tag 720 activates appropriate video messages to attract prospective buyers. For example, in a garden supply area a monitor might display sight and sound of appropriate messages for low, medium, and high value prospects. As the prospect 710 moves to a paint display area, other monitors might display appropriate paint messages based upon the modeling score(s). The RFID tag 720 in the prospect's credit and/or debit card 730 identifies the prospect to the system.

Additionally, suggestions to add to shopping cart purchases might include items related to goods already in the shopping cart having other embedded RFID tags such as paint rollers and brushes and suggesting paint sprayers to medium and high value purchasers of large quantities of paint.

At present, telephonic communications are transmitted via landlines, satellites and microwave towers and wireless transmissions by cellular telephone. Future developments will enable TV Cable and TV satellite operators to compete for telephonic services similar to cable Internet access. A means to identify a caller using cable or TV satellite by a number in the same fashion as ANI is within the ordinary skill of the art and such transmissions will be transparent to the caller and received by the person called. Thus, the invention may also be practiced through the use of cable and TV satellite communications.

Many modifications and other embodiments of the invention will come to mind to one who is skilled in the art to which this invention pertains having the benefit of the teachings presented in the foregoing description and the associated drawings. Therefore, it is to be understood that the invention is not to be limited to the specific embodiments disclosed and that modification and other embodiments are intended to be included within the scope of the appended claims. Although specific terms are employed herein, they are used in a generic and descriptive sense only and not for the purposes of limitation.

I claim as my invention:

1. A method for direct marketing of a primary product or service with a prospective customer comprising:
   (a) establishing a first communications link between a prospective customer using a device providing a unique identification number and a marketer's communications device;
   (b) automatically transmitting the unique identification number associated with the prospective customer's device to the marketer's communications device;
   (c) establishing a second communications link between the marketer's communications device and a marketer's computer operably connected to a tangible memory apparatus having a prospective customer database comprising prospective customer information associated with the unique identification number of the prospective customer's device;
   (d) the marketer's computer pulling in or developing a predictive modeling score or customer value, based on the prospective customer information;

(e) preparing and entering into a database a plurality of scripts targeted for prospective customers, based on a prospective customer's modeling score or customer value and the primary product;

(f) the wording of said plurality of scripts differing based upon a prospective customer's modeling score or customer value and the primary product;

(g) the marketer's computer selecting, prior to the primary offering with the prospective customer, which script the marketer will use to communicate with the prospective customer based on the prospective customer's modeling score or customer value and the primary product.

2. The method of claim 1 in which the unique identification number is a prospective customer telephone number, radio frequency identification number, television cable identification number or television satellite identification number.

3. The method of claim 1 in which the prospective customer information comprises one or more data points.

4. The method of claim 3 in which the communications device is located in a call center and the data points comprise prospective customer information collected from inside the call center or information collected from outside the call center, or both.

5. The method of claim 1 in which the information in the database determines subsequent marketing actions with the prospective customer.

6. The method of claim 5 in which the marketing actions determined by the database information includes one or more of; which salesman is selected to handle the communication, priority handling, which offer is made to the prospective customer, which script is given to the salesman, which subsequent offers are made, which package inserts are sent, which delivery container is used, with method of delivery is used, and which advertising is sent to the prospective customer.

7. The method of claim 6 further including the step of billing the customer.

8. The method of claim 6 further including the step of analyzing the effectiveness of the advertising as a function of revenue received.

9. The method of claim 6 further including the step of analyzing the effectiveness of the advertising as a function of the number of first communication links established.

10. The method of claim 6 further including the step of analyzing the effectiveness of advertising as a function of the interaction between the prospective customer and the salesperson.

11. The method of claim 6 in which the value of the individual prospective customer influences the selection of the sales representative.

12. The method of direct marketing of claim 6 further including the step of analyzing the effectiveness of the advertising as a function of customer modeling score or customer value.

13. The method of claim 1 in which a salesperson is operating said marketer's computer.

14. The method of claim 13 in which a particular salesperson is chosen, based upon the prospective customer information in the database.

15. The method of claim 13 including the step of updating the prospective customer activity database based upon the result of the salesperson's interaction with the prospective customer.

16. The method of claim 15 in which the prospective customer's modeling score is updated.

17. The method of claim 13 further including the step of analyzing the effectiveness of advertising and telemarketing expense as a function of the average revenue per interaction between prospective customers and salespersons.

18. The method of direct marketing of claim 13 in which the prospective customer's modeling score or value determines how much time a salesperson spends communicating with the prospective customer.

19. The method of claim 1 in which the prospective customer contact initially comes from a land line, cell phone, video phone, fax, mail, e-mail or Internet communication.

20. The method of claim 1 in which the value of the individual prospective customer influences the priority order in which individual prospective customer's call is answered.

21. The method of claim 1 in which the predictive modeling score identifies the prospective customer as high, medium or law value customer.

22. The method for marketing a primary product or service of claim 1 in which the prospective customer contacts a marketer advertising a product or service for sale or in which a marketer or a marketer's representative contacts a prospective customer about a product or service for sale.

23. The method for marketing a primary offering of claim 1 in which a salesperson reads the script to the prospective customer.

24. The method of direct marketing of claim 1 in which the prospective customer modeling scores or customer value are visible on the computer.

25. The method of direct marketing of claim 1 in which the prospective customer is connected to a salesperson or an interactive voice response device.

26. The method of direct marketing of claim 1 in which the scripts further comprise the offering of supplemental secondary products or services, based on the prospective customer's database information and the primary product.

27. The method of direct marketing of claim 1 in which the prospective customer's modeling scores or customer value is reclassified during a communication, based on new information received during the communication.

* * * * *

UNITED STATES PATENT AND TRADEMARK OFFICE
CERTIFICATE OF CORRECTION

| | | |
|---|---|---|
| PATENT NO. | : 8,234,169 B2 | |
| APPLICATION NO. | : 10/860231 | |
| DATED | : July 31, 2012 | |
| INVENTOR(S) | : Eileen A. Fraser | |

It is certified that error appears in the above-identified patent and that said Letters Patent is hereby corrected as shown below:

Column 18, Line 47:

Appendix I – Pages 1 and 2 are attached to the patent.

Column 19, Line 32, Claim 6:

After "which delivery container is used,"
Delete "with method" and insert -- which method --.

Column 20, Line 28, Claim 21:

After "high, medium or"
Delete "law" and insert -- low --.

Signed and Sealed this
Twenty-seventh Day of November, 2012

David J. Kappos
*Director of the United States Patent and Trademark Office*

Appendix I - Page 1

Customer Identification
- Address
- Zip code
- County
- ADI (area of dominant influence)
- ANI(s) number
- Delivery method/type

Response type
- Phone(s)
    - Inbound
    - Outbound
    - Customer Service
- Internet
    - Search Engine
    - e-mail marketing
    - Affiliate
    - e-mail

Life Events
- Just moved
- New baby
- New job
- Marriage
- Divorce
- Retirement

Demographics
- Age
- Gender
- Household income
- Type and Length of residency
- Marital status
- Ethnicity
- Presence of Children
- Employment/Occupation

Psychographics
- Lifestyle, Privacy, Events etc.

Media Channel & Marketing Source
- Electronic Media
    - TV
        - Infomercial
        - Station
        - DayPart/Prime time
        - Home shopping
    - Radio
        - Station
        - Time slot
    - e-commerce
- Print by class, title and name
    - Newspaper
    - Free Standing Insert (FSI)
    - Magazine
    - Catalog
    - Direct Mail
    - Package Insert
    - Bounceback
    - Co-op
    - Cards, including Warranty
    - Statement Stuffers
    - Coupon
    - Gift Certificate
- Retail
    - Department
    - Apparel
    - Specialty
    - Store location
- 800 # vs. paid call
    - by number
- MultiChannel
    - Buyer
    - Responder

Appendix I - Page 2

Purchasing History
  Prior Purchases
    Product Classifications
    Product Brands & Groups
      Loyalty
    Sku # or unique #, including
      Radio frequency ID tags
    Products by name and number
      Primary
      Upsell
      Downsell
    Quantity
    Size Price
    Monetary Value
    Individual transactions
    Lifetime transactions Recency
    Last Purchase
    Every Purchase
    Never Purchase Continuity
    Frequency
    Turns 3rd Party and Club experience
  Rush Shipping Customer Service
    Returns
    Cancels
      Chargebacks, unsatisfied
  Inventory availability

Non-purchase response
  Responded but did not purchase

Payment Methods
  Credit card by Brand
  Debit card by Brand
  Credit clearance
  Check
  Money Order
  Single pay
  Multi-pay
    # of payments

Offers/Script
  Offer Savings Value
  Advertised price
  Quantity
  Gift Certificate
  Free gifts
  Free shipping & handling
  Membership/Club
  $ Discounts
  % off
  Free Trial
  Paid Trial
  2 for 1
  Friend get Friend
  Continuity
  Agree to fixed number shipments

Time and Frequency
  Time of day
  Day of week
  Date
  Seasonality
  Holiday
  Birthdate/Anniversary
  Duration of contact
  Dormancy
  Number of contacts
  Recency
  Frequency